INVENTORS:
DUNCAN B. COX, JR.
KENNETH FERTIG
BY Arthur A. Smith, Jr.
ATTORNEY

INVENTORS
DUNCAN B. COX, JR
KENNETH FERTIG
BY: Arthur A. Smith, Jr.
ATTORNEY

INVENTORS:
DUNCAN B. COX, JR.
KENNETH FERTIG
BY: Arthur A. Smith, Jr.
ATTORNEY

United States Patent Office 3,706,092
Patented Dec. 12, 1972

3,706,092

ELECTRONIC INSTRUMENT SERVO

Duncan B. Cox, Jr., Manchester, and Kenneth Fertig, Brookline, Mass., assignors to Massachusetts Institute of Technology, Cambridge, Mass.

Continuation of abandoned application Ser. No. 764,505, Oct. 2, 1968. This application Apr. 21, 1971, Ser. No. 136,231
Int. Cl. H03k *13/20*
U.S. Cl. 340—347 AD 1 Claim

ABSTRACT OF THE DISCLOSURE

An electronic instrument servo for continually measuring a differential in a received input signal, whether modulated or unmodulated, and generating an instantaneous, synchronous, encoded output proportional to the measured differential. The servo basically comprises a feedback loop which generates a tracking signal differing in phase from a reference in proportion to the measured differential, and apparatus for reading out (strobing) the content of the loop at very precise time intervals relative to the reference, thereby generating an instantaneous and synchronous encoding of the phase angle of the tracking signal.

This application is a continuation of application Ser. No. 764,505 filed Oct. 2, 1968, now abandoned.

The invention herein described was made in the course of work performed under a contract with the Department of the Air Force.

BACKGROUND OF THE INVENTION (1) Field of the invention

This invention relates generally to data acquisition and control systems and particularly to an electronic instrument servo employing phase-lock techniques for use as a general-purpose input/output mechanism in such systems.

(2) Description of the prior art

The use of digital computers in data acquisition and control systems has required the development of a wide variety of input/output circuits to function as the interface between analog sources and the digital computer. These input/output devices receive the data to be operated on and process and encode it for transfer to the computer and vice versa. Because of the varied nature of the received sources, it has generally been necessary to specifically design a particular special-purpose input/output circuit in accordance with the particular nature of the input and the type of processing to be performed. Consequently, as the tasks assigned the digital computer have expended, there has been a proportionate increase in the number and complexity of the required interface, along with a consequent reduction in processing speed, resolution, and accuracy. Further, many of the special-purpose input/output devices have some or all of the disadvantages of equipment complexity, lack of desired accuracy and precision and the like.

For example, phase repeater servos employing phase-locked loops of the type described in "Phase Lock Techniques," by Floyd M. Gardner, John Wiley & Sons, Inc., New York 1966, are commonly used in conjunction with electromechanical resolvers as a means of continuously tracking variations in phase of a phase modulated output from the resolver and generating a substantially noise free reproduction thereof. Since, conventionally, the output from the phase-locked loop is analog (e.g., square waveforms), external circuitry is needed to effect the desired timing measurements and encoding prior to transfer of the data to the computer. In some cases, the rising or falling edges of the loop's output are used to start or stop a counter which is driven by a reference clock. The final counter outputs, as variable clock times, represent the encoded phase angle data. Since the pulse width of the signal being tracked is continuously changing, the data readout is not simultaneously synchronous and instantaneous. If counting is commenced on the occurrence of a reference pulse and stopped on, say, the rising edge of the signal from the loop, readout is instantaneous but nonsynchronous since it is not known a priori at what time the rising edge occurs. Conversely, if counting is commenced on the signal's rising edge and stopped when the reference pulse appears, the readout, although synchronous, is not instantaneous because the data readout represents a past value of the input signal. Accuracy is further diminished due to the inherent time delays in starting and stopping the counter.

Consequently, the various types of phase measurement techniques generally tend to lack the joint precision and timeliness required in inertial applications and the like.

SUMMARY

In view of the foregoing limitations on special-purpose input/output mechanisms used in data acquisition and control systems, it is a general object of the invention to provide an electronic instrument servo having a flexibility of functioning as a general-purpose input/output mechanism.

It is another general object of the invention to provide an electronic instrument servo capable of continuously measuring the differential in a modulated or unmodulated input signal relative to a reference and generating an instantaneous, synchronous, encoded output proportional to the measured differential.

It is another object of the invention to provide an electronic instrument servo capable of operating as an improved phase repeater servo having the inherent capability of providing whole word, instantaneous, synchronous encoding of the phase angles of time waveforms.

It is another object of the invention to provide an electronic instrument servo capable of measuring phase angle between a set of waveforms and a reference waveform and of generating, with minimum components and maximum accuracy, encoded whole word data indicative of the phase angle being measured.

It is a still further object of the invention to improve the operation of a basic phase-locked loop by incorporating therein apparatus for strobing said loop in such a way as to generate a unique, instantaneous, synchronous encoding of a phase angle of interest.

It is a still further object of the invention to provide an electronic instrument servo which is capable of operating as an improved analog-to-digital converter having unlimited resolution.

These and other objects are met by a feedback loop comprising a comparator, a voltage controlled oscillator, and a $2^n$ continuous forward binary counter for continually measuring the differential in a received input signal relative to a reference and generating a tracking signal having a phase $\theta$ which varies relative to a clock reference in proportion to the measured differential. The counter, at any instant of time, contains a set of waveforms representing the tracking signal. The contents of the counter are strobed or read out at very precise time intervals relative to the clock reference. In the preferred embodiment the output from each stage of the counter connects to a logical flip flop element or gating logic. The reference waveform produced by the clock is a square wave, and on its rising (or falling) edges a readout or strobing pulse is transmitted to the flip flops, generating a whole word binary number indicative of the phase angle $\theta$. Since the strobing pulses are synchronized with the clock waveforms and are applied to the gating logic at precisely known time intervals, the binary readout is both instantaneous and synchronous. As described later in the specification, the invention is capable of receiving and processing either modulated or unmodulated inputs and generating the aforementioned encoded output which, though generally binary, may also be encoded in some other type system.

Further objects and advantages of the present invention and a better understanding thereof will become apparent in the following detailed description taken in conjunction with the accompanying drawings of which:

PREFERRED EMBODIMENT

Figure 1:
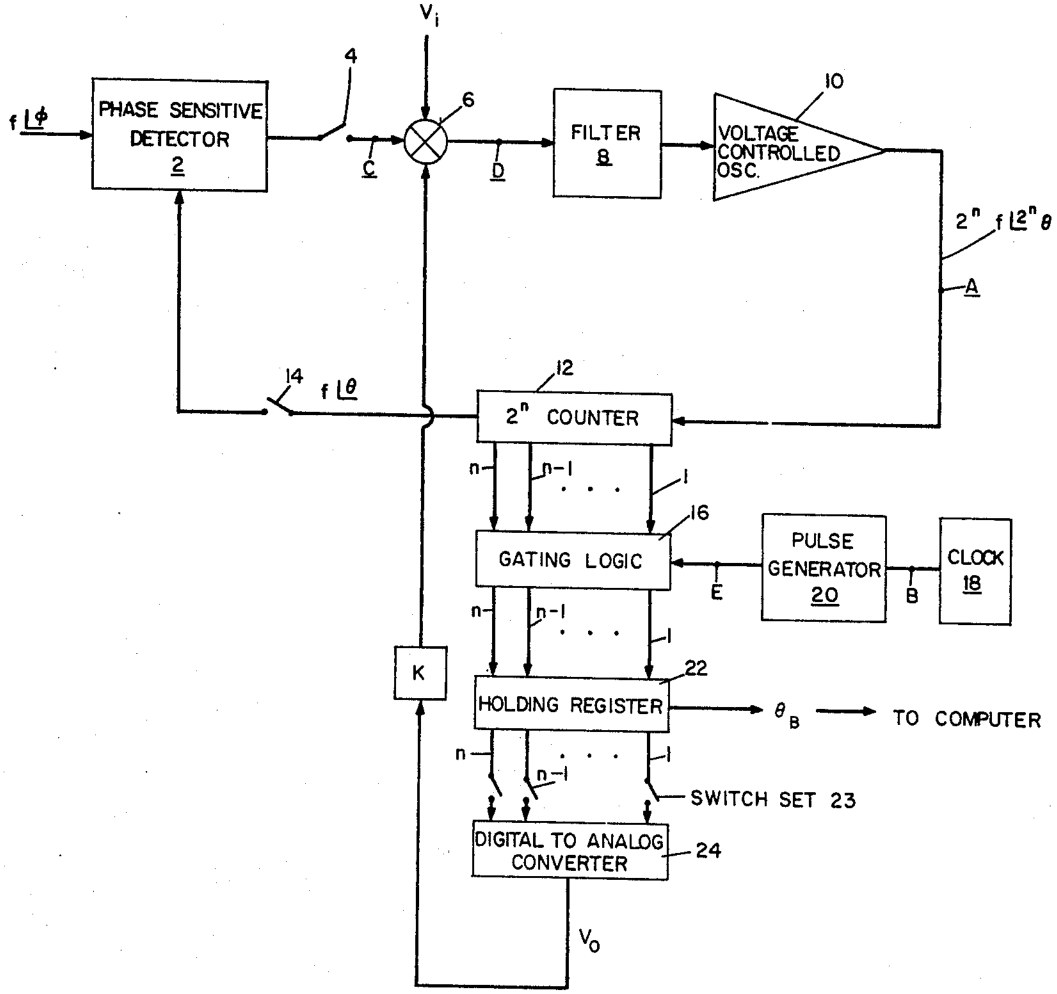
FIG. 1 is a flow diagram showing the components comprising the preferred embodiment of subject invention.

The preferred embodiment of the invention is shown in the flow diagram of FIG. 1. Since all of the components used are standard in the art, no attempt is made to detail them further.

As noted in FIG. 1, the circuit includes phase sensitive detector 2 coupled via switch 4 to summer 6, the output of which is filtered by filter 8 and applied to voltage controlled oscillator 10. The output of oscillator 10 is coupled to the input stage of $2^n$ forward only continuous binary counter 12, where $n$ is any integer from one to infinity. The final stage of counter 12, in turn, connects to phase sensitive detector 2 via switch 14. Each stage of counter 12 also connects to gating logic 16 and thence to holding register 22, the output of which is a whole word encoded number $\theta_B$. (In the preferred embodiment, the gating logic and hold register comprise flip-flop elements.) Coupled to gating logic 16 is pulse generator 20, which interconnects to the output of clock 18. (The clock comprises a high frequency oscillator followed by a binary countdown chain, not shown, from which several signals with locked frequencies and phases may be obtained.) Holding register 22 is also shown coupled via switch set 23 to digital-to-analog converter 24, which, in turn, is coupled back to summer 6 through gain K.

Phase repeater servo

When the servo is employed as a phase repeater, switches 4 and 14 are closed, switch set 23 is open, and input voltage $V_i$ to summer 6 is zero. The result is a phase-locked loop configuration which operates as follows.

The object of the phase repeater is to continually measure and track the phase differential $\phi$ between a signal $f\angle\phi$, which is phase modulated on carrier waveforms, say, from a resolver, and a reference signal $f\angle 0$ generated by clock 18. (According to the notation used, each phase modulated signal is distinguished by frequency and phase angle. For example, the notation $f\angle\phi$ indicates a signal of frequency $f$ and phase angle $\phi$.)

Initially, $\phi$ is constant, and the center frequency of oscillator 10 is set such that its output has a phase and frequency $2^n f\angle 2^n\theta$, $2^n$ times the phase and frequency of the initial input. (The frequency and phase of the oscillator output is set at $2^n$ times the input frequency and phase because of the presence of the $2^n$ stage binary counter 12 within the loop.) Initially, therefore, signals $f\angle\phi$ and $f\angle\theta$ are in phase.

As the phase $\phi$ of the input signal begins to vary responsive to an angle change in, say, the resolver relative to its reference point, this phase variation or differential is measured by phase sensitive detector 2, which is continually comparing $f\angle\phi$ with $f\angle\theta$, and which generates an output voltage being a measure of the phase difference between the two inputs. The difference signal from detector 2 is filtered by filter 8 which extracts the average value of the difference signal and applies an error voltage to oscillator 10. The error voltage acts to increase or decrease the frequency of oscillation of oscillator 10 in a direction to drive the error voltage to zero. Hence, the phase of the oscillator's output is shifted in proportion to the phase shift of signal $f\angle\phi$. The output of oscillator 10, in turn, is fed to counter 12 in each state of which the frequency and phase of the oscillator output is continually halved. The output of the final stage of counter 12 is a square wave $f\angle\theta$ where $\theta$ corresponds to the measured differential in $\phi$. If, in the interim, phase $\phi$ has again shifted, detector 2 generates an error voltage, and the above described process is repeated, i.e., signal $f\angle\theta$ continually tracks the phase differential of signal $f\angle\phi$ relative to reference waveform $f\angle 0$.

At any given instant of time, each of the stages of counter 12 is either in a logical one or logical zero state, depending on the condition of the waveform stored in that stage, i.e., either "up" or "down." The output of each stage of counter 12, in turn, is coupled to a logical element (flip-flop) in gating unit 16. The phase angle $\theta$ of the set of square waves stored in counter 12 is determined by a technique known as strobing which allows the contents of counter 12 to be read out in binary form at precisely set time intervals.

According to the invention, reference waveform $f\angle 0$ is generated as a train of square waves from reference clock 18. Signal $f\angle 0$ is fed to pulse generator 20 which generates a strobing pulse at the exact instant when waveform $f\angle 0$ changes state (in either the positive or negative going direction). This strobing pulse is transmitted to the flip-flops of gate 16. For those elements where there are present as inputs both a strobing signal and a signal from the respective counter stage, a pulse is generated representing a logical one. For those elements where there exists no input signal from the respective countdown stage, no pulse is generated, indicating a logical zero. The resultant binary representation $\theta_B$ of the contents of counter 12 is stored in holding register 22 for transfer to the digital computer. (The use of flip-flops as logical elements ensures that the last-read binary word is not destroyed upon readout.) Because of the timing relationship between the reference waveforms and the strobing pulses, the time at which each strobing pulse occurs is known with precision, and hence the readout of the phase of the signal within counter 12 is extremely precise relative to the reference in that it is instantaneous and synchronous.

Figure 2:
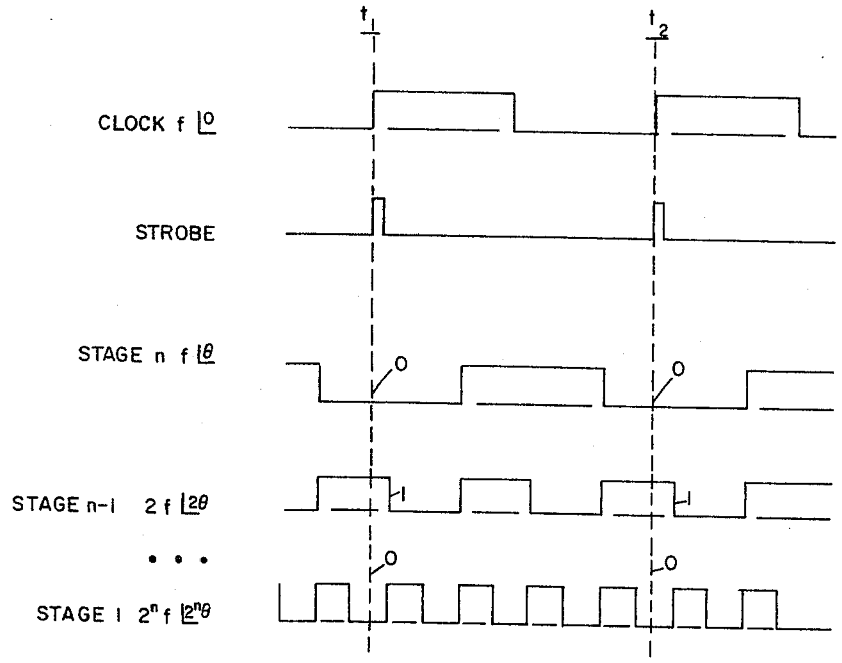
FIG. 2 is a flow diagram depicting the interrelationship of the reference waveform, strobing pulses, and output waveforms from the counter of FIG. 1.

A representation of the strobing waveforms relative to the contents of counter 12 is shown in FIG. 2. As noted therein, at time $t_1$ when clock waveform $f\angle 0$ is changing state in the positive going direction, the aforementioned strobing pulse is generated causing the previously described gating of counter 12 to occur. For the particular representation shown, at time $t_1$ no output is read from stage $n$ since signal $f\angle\theta$ is "down" (logical zero); a pulse is read from stage $n-1$ since signal $2f\angle 2\theta$ is "up" (logical one); and no pulse is read from stage 1 since signal $2^n f\angle 2^n\theta$ is "down." The resultant phase data is read out from gate 12 in binary form as 0 1 . . . 0. This process is repeated, if desired, for each succeeding time interval.

The strobing technique as described results in a highly precise, instantaneous, synchronous binary encoding of the phase of signal $f\angle\theta$ which is an essentially noise free reproduction of signal $f\angle\phi$. Knowledge of whether waveform $f\angle\theta$ is "up" or "down" narrows the uncertainty in the angle to a 180-degree region; knowledge of whether waveform $2f\angle 2\theta$ is "up" or "down" further narrows uncertainty in the angle to a 90-degree region; and so forth through each succeeding stage of the counter.

Analog-to-digital encoder

When the servo is employed as an analog-to-digital encoder, the circuit path of FIG. 1 is established as follows: switches 4 and 14 are opened and switch set 23 is closed to summer 6; input voltage $V_i$ to summer 6 is the analog voltage to be encoded and is changing value relative to a reference voltage, say, for example, zero. The resulting feedback path functions essentially as described for the phase repeater servo, except that the tracking signal from the loop is a voltage $V_o$ proportional to the phase difference $\theta$ between the set of waveforms in counter 12 and the reference waveform generated by clock 18. Voltage $V_i$ is compared in summer 6 with voltage $V_o$, and an output voltage representing the difference between the two inputs is generated. This difference voltage, as before, is filtered by filter 8 and applied to oscillator 10 causing oscillator 10 to change its center frequency in a direction to minimize the applied error voltage, thereby shifting the phase of the oscillator's output proportional to the measured difference. (Again, because of the presence of $2^n$ stage counter 12 within the loop, the frequency and phase of the oscillator's output is $2^nf\angle 2^n\theta$, where $\theta$ is initially in phase with the waveform generated by reference clock 18.) At any instant of time, therefore, the contents of counter 12 are a set of waveforms which vary in phase $\theta$ relative to the phase of the reference waveform generated by clock 18 in proportion to the measured voltage differential between $V_i$ and the reference. Once again, the contents of gating logic are strobed via pulse generator 20 and clock 18 as aforementioned, and the resulting whole word binary number $\theta_B$ is stored in holding register 22 pending transfer to the computer. Since switch set 23 is now closed, $\theta_B$ is also converted back to an analog form via digital-to-analog converter 24, which, for example, may comprise a standard ladder network of resistors. The gain K of the output voltage $V_o$ is set at some predetermined value, and $V_o$ is then applied back to summer 6. The process is continually repeated as aforementioned such that at precisely known time intervals a whole word binary representation of a continually changing input voltage is available, and this representation is both instantaneous and synchronous.

The invention also functions as an extremely simple analog-to-digital converter by employing the phase sensitive detector in the loop of FIG. 1 such that it acts as a pulse width modulator. Referring now to FIG. 1, analog-to-digital conversion is accomplished by closing switches 4 and 14, opening switch set 23, and inserting the voltage to be converted as an input $V_i$ to summer 6. The input $f\angle\theta$ to phase sensitive detector 2 is a fixed phase angle. The loop then operates as previously described.

Combined modes

In certain applications it may be desirable to operate the servo in a combined mode, where both of the circuit paths of FIG. 1 are activated by closing all of the switches. This is often the situation where correction voltages are to be added to the phase tracking signal in the loop.

For example, ideally the electrical phase angle data transmitted to the computer from the loop (where the circuit is functioning as a phase repeater servo, and hence the phase repeater capability is dominant) is linearly proportional to the quantity being measured, e.g., shaft angle. However, the accuracy of the resolver or other source may be considerably greater than its linearity, in which case it is necessary to remove the known nonlinearity data. For example, if the lowest frequency signal $f\angle\theta$ in the phase-locked loop is multiplied by signal $f\angle 0$ from reference clock 18, the average of the product is a triangular function of the angle $\theta$ and hence of the angle $\phi$. If this product signal is added to the signal at the output of phase sensitive detector 2 within the loop, the output data angle $\theta$ will be displaced from the input data angle $\phi$ by the triangular correction function. Similar correction functions can be generated with different periods and phase angles as a function of $\theta$ by using different frequencies and angle references in time. By using a set of correction voltages generated in this manner, essentially any nonlinearity can be compensated for if it is a known periodic function of $\phi$.

Mechanization of the aforementioned technique for compensating for periodic instrument errors can be accomplished by using the output voltage $V_o$ from digital-to-analog converter 24 since this voltage is proportional to the phase angle difference between the set of waveforms in counter 12 and the reference waveforms generated by clock 18. Accordingly, $V_o$ is, in effect, hence a triangular function of phase angle $\theta$. The output voltage from phase sensitive detector 2 is compared in summer 6 with this average product signal $V_o$, resulting in an output data angle $\theta$ displaced from the initial data angle $\phi$ by the triangular correction function. Hence, the binary angle data supplied by the circuit is compensated for prior to its transfer to the computer.

A variety of other correction functions may be added as inputs $V_i$ to the loop via summer 6 depending on the nature of the problem to be solved.

Additional capabilities

The inherent flexibility of subject invention makes it particularly useful as a general purpose input/output mechanism which, with minimum additional modifications according to a building block concept, enable it to perform a wider variety of hybrid computations and processing operations.

Figure 3:
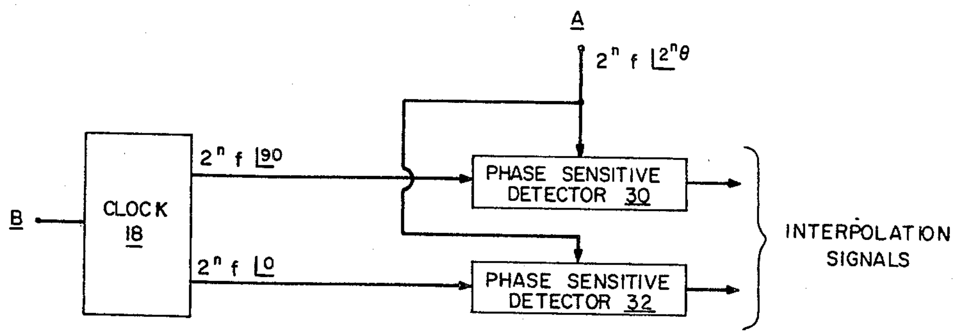
FIG. 3 is a block diagram showing additional components interconnected with the circuit of FIG. 1 to provide the capability of infinite resolution.

For example, referring to FIG. 1, since the output of oscillator 10 is continuously phase modulated, it possesses infinite resolution. When the basic circuit of FIG. 1 is employed as an analog-to-digital converter, this signal can be coupled from the loop and compared with clock reference signals to generate interpolation signals that can then be quantized via another analog-to-digital loop. One possible mechanization of this scheme is shown in FIG. 3 where signal $2^nf\angle 2^n\theta$ is coupled at point A in the loop to phase sensitive detectors 30 and 32. Reference signal $2^nf\angle 90$ from clock 18 is compared in detector 30 with the oscillator output and a difference or interpolation signal generated. Likewise, signal $2^nf\angle 0$ from clock 18 is compared in detector 32 with the oscillator output and a second difference or interpolation signal generated. By proper utilization of these interpolation signals as aforementioned, unlimited resolution can be achieved.

Figure 4:
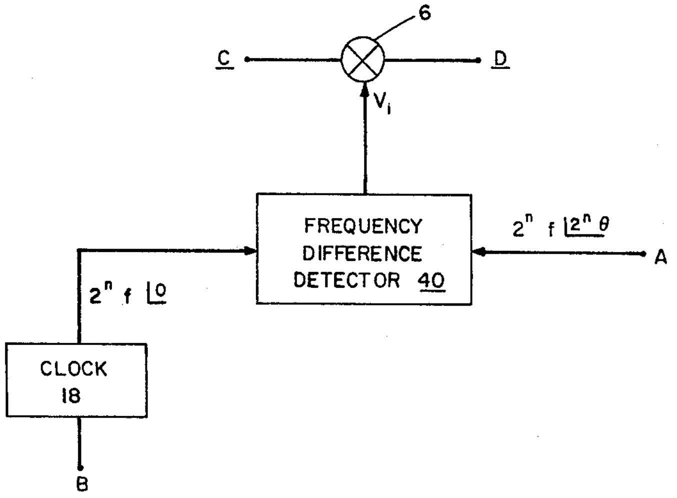
FIG. 4 is a block diagram showing additional components interconnected with the circuit of FIG. 1 to provide the capability of phase shift compensation.

In some phase repeater servo applications (switch set 23 of FIG. 1 open) where the input is generated by a resolver, energy storage mechanisms associated with the transmission path introduce a phase shift into the carrier waveform as an approximately linear function of frequency. As indicated in FIG. 4, these errors are determined by continually comparing via frequency difference detector 40 the frequency of signal $2^nf\angle 2^n\theta$ from oscillator 10 with the frequency of signal $2^nf\angle 0$ from reference clock 18. The difference, if any, represents the phase shift error. A correction voltage $V_i$, proportional to this error, is generated by detector 40 and applied to summer 6, where it is added to the output from detector 2.

The invention can be extended to the situation where there are two signals available, corresponding to a common measurement variable, as for example, from one-speed and *m*-speed resolvers on a common shaft. The one-speed signal $f_1\angle\phi$ and the *m*-speed signal $f_2\angle m\phi$ can be encoded separately, each with its own phase-locked loop strobed from a common clock. However, with this arrangement, unavoidable misalignment between the one-speed and *m*-speed data will cause, for certain angles, an inconsistency in the binary encoded data. This inconsistency is due to the fact that, for certain angles, the overlapping bits do not agree. Specifically, the least significant bit in stage 1 of the counter for, say, the one-speed resolver is not in the same logical state as the most significant bit in stage *n* of the counter for the *m*-speed resolver. In such a case, it becomes necessary to add or subtract a unit from the coarse word accordingly. According to subject invention, a bit is added to the coarse word by delaying the coarse word strobe. Data alignment using subject strobing technique is as follows.

A phase alignment is introduced in waveform $f_1\angle\theta$ from the countdown unit of the coarse data loop such that the waveform corresponding to the least significant bit from that loop lags the waveform corresponding to the most significant bit from the fine data loop by about 90 degrees. The countdown of the coarse loop is then strobed as previously described if the overlap bits agree. Otherwise, the strobe of the countdown of the coarse loop is delayed until the overlap bits do agree. The correction signal for introducing the necessary phase misalignment is effected by adding a small fixed voltage to the signal at the output of the phase sensitive detector in the coarse data loop. The above-described strobing technique results in the whole word data being obtained jointly from the one-speed and *m*-speed resolver signals.

An alternate data alignment process is to compare the phases of the waveforms corresponding to the overlapping bits and use the phase difference signal to bias the coarse loop into proper alignment.

In many phase repeater servo applications, (switches 4 and 14 closed, switch set 23 open), the phase and frequency of the incoming waveform to the phase-locked loop is approximately known a priori, and the data of interest is the difference between the actual real time output from the loop and this estimated or expected output. Examples of this situation occur in certain Doppler-type navigation systems where the approximate course of the vehicle is known from other sources of navigation information, and wherein it is desired to determine the difference between the predicted course and the actual course as read from the loop. According to subject invention, the phase and/or frequency of the strobing waveform can be modified to represent the expected data and strobing performed as aforementioned. Modifying the phase and/or frequency of the strobing waveform results in a signal being effectively added to or subtracted from the binary data in the loop's counter.

Figure 5:
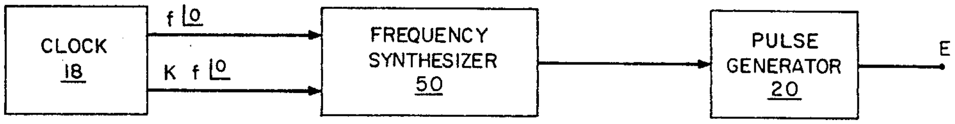
FIG. 5 is a block diagram showing additional components interconnected with the circuit of FIG. 1 to provide the capability of modifying the strobing pulses of FIG. 1.

Assume now that the expected Doppler shift in the incoming waveform to the loop is $k_1f$ c.p.s. where $k_1$ is some rational number less than unity. As shown in FIG. 5 in conjunction with FIG. 1, waveforms $f/0$ and $k_2f/0$ are fed from reference clock 18 to frequency synthesizer 50 where they are added. The summed output $(1+k_1)\ f/0$ is transmitted to pulse generator 20 which, in turn, generates a train of strobing pulses to gating logic 16 according to the process previously described.

If the frequency of the strobing waveform is altered by a constant amount, a linear ramp function is effectively added to the binary data read out from holding register 22. Consequently, where the synthesizer inputs are basic clock waveforms, a stroke frequency and phase can be produced that is any linear combination of the clock frequencies and phases. In this way, any ramp function may be effectively added to or subtracted from the binary data. Alternately, if waveforms from the loop's counter 12 are used as inputs to the synthesizer, a linear function of the phase tracked by the phase-locked loop may be added to or subtracted from the binary data. Further, by using other signals as inputs to the synthesizer, any function of time can be added to or subtracted from the binary data.

Analog functions, such as multiplication and division, are performed in a manner analogous to computing instrument servos. Referring now to FIG. 1, switches 4 and 14 are opened and switch set 23 is closed. The desired function is then effected by exciting digital-to-analog converter 24 with an appropriate voltage. The loop itself functions exactly as previously described.

Other modifications of the invention herein described will occur to those skilled in the art. All such modifications are considered to be within the spirit and scope of the invention as defined.

Having thus described our invention, we claim:

1. An electronic instrument servo for measuring the voltage difference between an input voltage $V_i$ relative to a first reference voltage, and generating an instantaneous and synchronously encoded output proportional to said measured difference voltage, said servo comprising:

(a) a clock continually generating a train of waveforms of constant frequency $f$ to act as a second reference signal;

(b) a feedback loop for receiving said input voltage $V_i$ and generating a tracking signal with phase $\theta$ differing from the phase of said second reference signal in proportion to said voltage difference between said input voltage $V_i$ and said first reference voltage, said loop comprising a phase sensitive detector adapted to receive a fixed phase angle signal and said tracking signal and generating an output voltage that its proportional to the phase difference between said fixed phase angle signal and said tracking signal, a summer coupled to said detector and adapted to receive said input voltage $V_i$ and said detector output voltage and generating an error voltage that is proportional to the voltage difference between said input voltage $V_i$ and said detector output voltage, a filter coupled to the output of said summer for filtering said error voltage, a voltage controlled oscillator coupled to said filter and having a frequency N times said reference frequency $f$, N being any integer from 1 to infinity, which generates an output signal related in phase to said second reference signal and which, responsive to said error voltage, changes said frequency of said oscillator in a direction to minimize said error voltage, a continuous forward counter for counting down said frequency of said oscillator output to generate said tracking tracking signal, and means for coupling said tracking signal to said phase sensitive detector;

(c) gating logic coupled to said counter;

(d) a pulse generator coupled to said clock for continually generating a train of strobing pulses synchronized in phase with said waveforms of said second reference signal; and (e) means for coupling said strobing pulses to said gating logic enabling said gating logic to generate said instantaneous and synchronously encoded output representing said phase $\theta$.

References Cited

UNITED STATES PATENTS

| | | | |
|---|---|---|---|
| 3,201,781 | 8/1965 | Holland | 340—347 |
| 3,199,104 | 8/1965 | Miller | 343—12 |

THOMAS A. ROBINSON, Primary Examiner
C. D. MILLER, Assistant Examiner

U.S. Cl. X.R.

328—133